(12) United States Patent
Liao et al.

(10) Patent No.: US 7,493,029 B2
(45) Date of Patent: Feb. 17, 2009

(54) CAMERA MODULE (75) Inventors: Jian-Chao Liao, Taichung (TW);
Yao-Ching Huang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 555 days.

(21) Appl. No.: 11/393,267

(22) Filed: Mar. 30, 2006

(65) Prior Publication Data

US 2007/0092234 A1   Apr. 26, 2007

(30) Foreign Application Priority Data

Oct. 20, 2005   (CN) .......................... 2005 1 0109272

(51) Int. Cl.
*G03B 17/00* (2006.01)
*H04N 5/228* (2006.01)

(52) U.S. Cl. ...................................... 396/55; 348/208.4

(58) Field of Classification Search .................. 396/13, 396/55; 348/208.99, 208.4, 208.5, 208.7
See application file for complete search history.

(56) References Cited

U.S. PATENT DOCUMENTS 5,266,988 A    11/1993  Washisu ...................... 354/70
5,732,291 A *   3/1998  Ohishi ......................... 396/55

FOREIGN PATENT DOCUMENTS

JP    2003111449    4/2003

* cited by examiner

*Primary Examiner*—Rodney E Fuller
(74) *Attorney, Agent, or Firm*—Thomas, Kayden, Horstemeyer & Risley (57) ABSTRACT

A camera module comprises a base, a lens joined to the base, a frame movably disposed on the base, an image detecting unit fixed to the frame and moving on the base via the frame, and a solenoid having a post moving between a first position and a second position. When the image detecting unit moves on the base via the frame, the post is in the first position and has no contact with the image detecting unit. When the image detecting unit moves on the base not via the frame, the post is in the second position and abuts the image detecting unit to position the image detecting unit.

12 Claims, 10 Drawing Sheets

CAMERA MODULE

BACKGROUND

The invention relates to a camera module, and in particular to a camera module having an image detecting unit with 2-dimensional motion.

Figure 1:
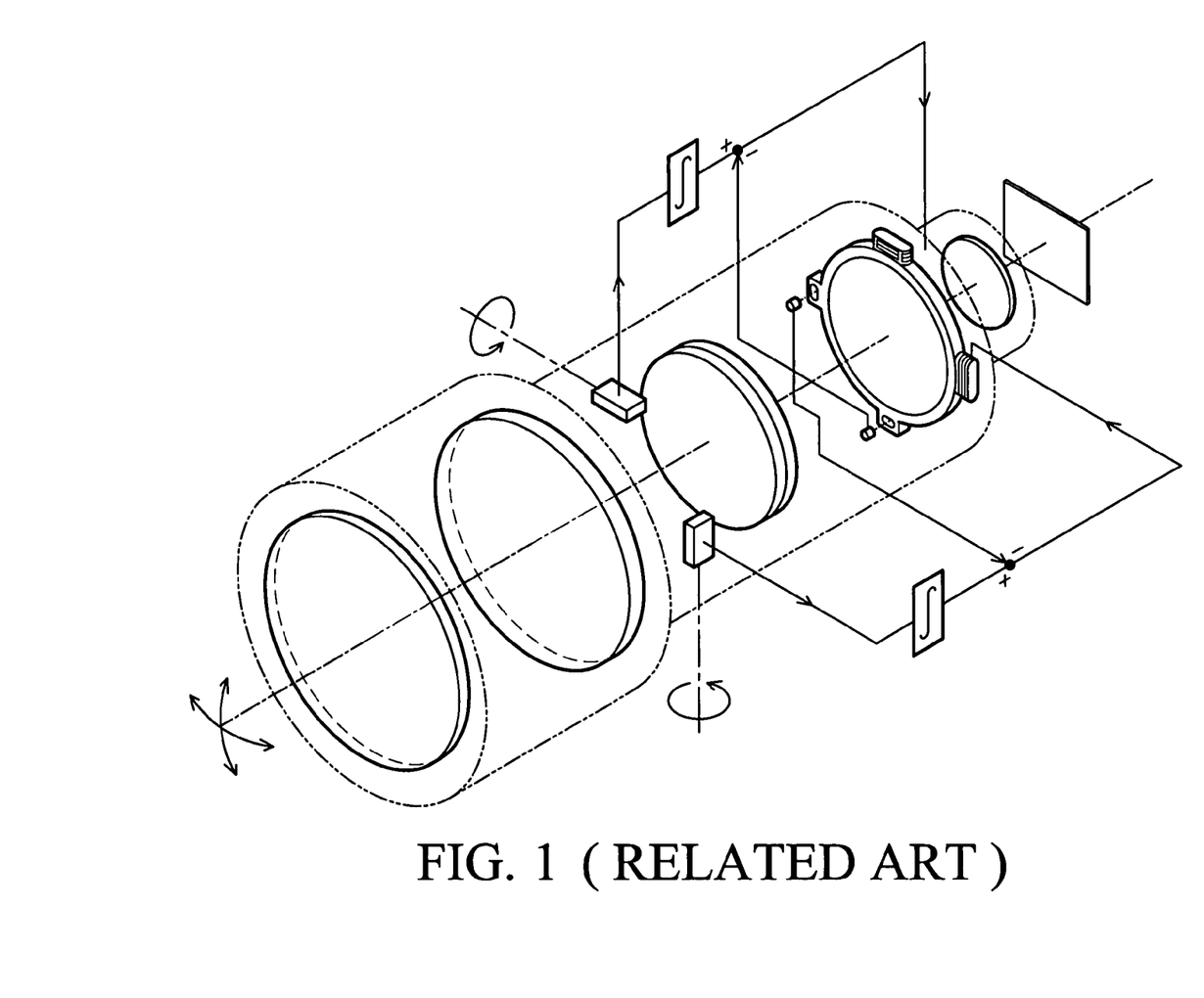
FIG. 1 depicts an image motion-suppressing device disclosed in U.S. Pat. No. 5,266,988.

Referring to FIG. 1, U.S. Pat. No. 5,266,988 discloses an image motion-suppressing device for a camera. The image motion-suppressing device is mounted in a lens. When the camera is used, an angular velocity meter measures the angular velocity of the moving camera and provides the measured data to a circuit to drive a driving part moving the lens in a direction of a vertical optical axis, thereby compensating or suppressing blurring due to vibration of the camera. When the motion suppressing device is not used, power is still provided to the driving part. This results in considerable power consumption.

Figure 2:
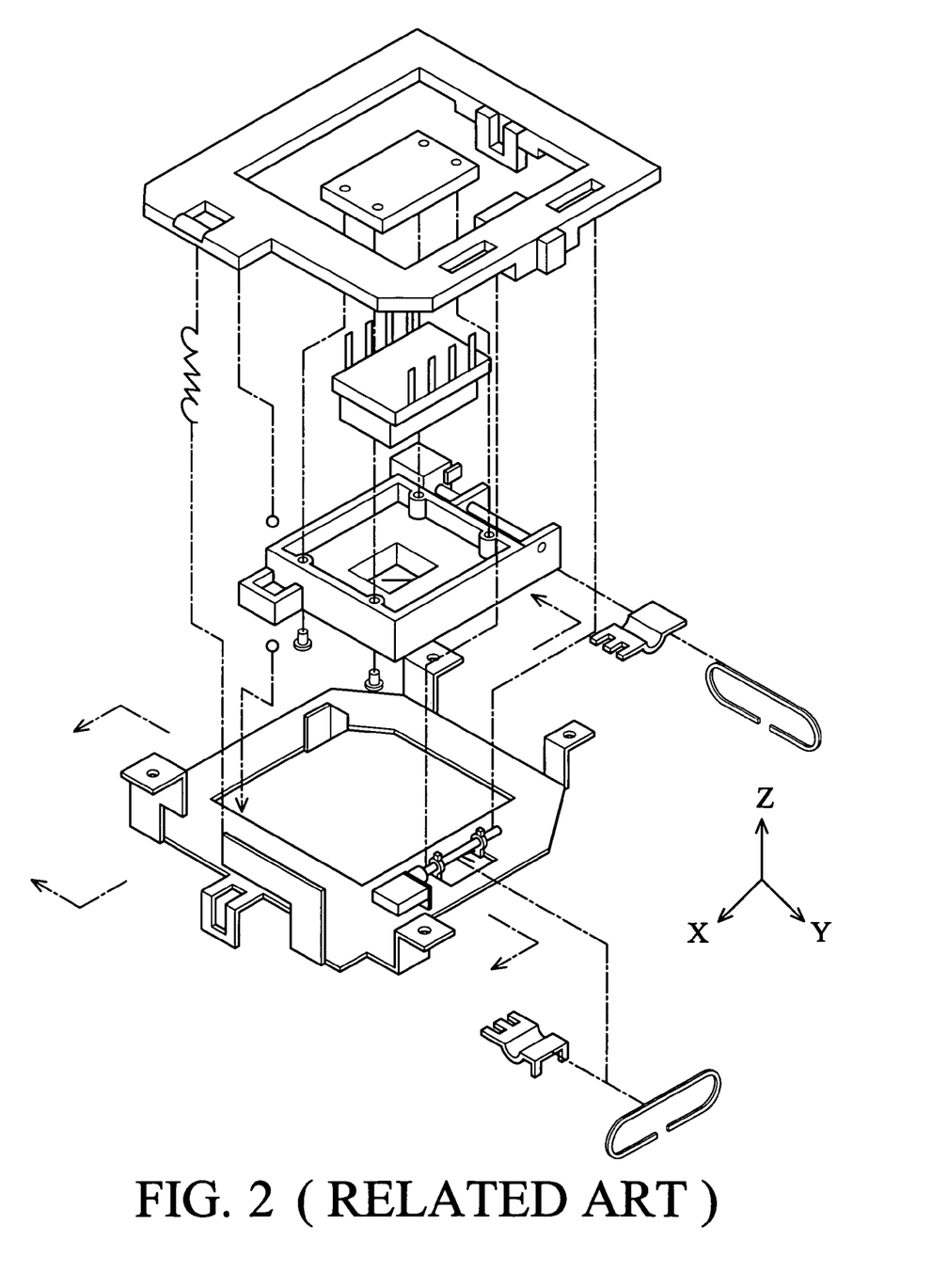
FIG. 2 depicts a moving mechanism disclosed in Japan Patent No. 3551174.

Referring to FIG. 2, Japan patent No. 3551174 discloses a moving mechanism. The moving mechanism employs piezoelectric elements to drive an image detecting unit, such as CCD, in a vertical direction such that blur can be compensated or suppressed, and it is applicable to any lens. The piezoelectric elements must be driven by voltage to move the CCD. As the CCD, however, is heavier than a single lens, a large piezoelectric element is needed, increasing the volume of the camera.

SUMMARY

An embodiment of a camera module of the invention comprises a base, a lens joined to the base, a frame movably disposed on the base, an image detecting unit fixed to the frame and moving on the base via the frame, and a solenoid having a post moving between a first position and a second position. When the image detecting unit moves on the base via the frame, the post is in the first position and has no contact with the image detecting unit. When the image detecting unit moves on the base not via the frame, the post is in the second position and abuts the image detecting unit to position the image detecting unit.

The frame comprises a first guide element by which the frame is joined to the base and moved in a first direction, at least one first coil disposed on the frame, at least one first magnet fixed to the base and opposite the first coil, and a first Hall element disposed on the frame adjacent to the first coil. Magnetic flux variation is generated between the first coil and the first magnet by providing voltage to the first coil, thereby moving the first guide element in the first direction.

The frame further comprises a moving frame joined to the base by the first guide element and moving in the first direction relative to the base, and a seat disposed on the moving frame and capable of moving relative to the base. The first coil and the first Hall element are disposed on the moving frame.

The seat comprises a second guide element by which the seat is joined to the moving frame, moving in a second direction relative to the moving frame, at least one second coil disposed on the seat, at least one second magnet disposed on the base opposite the second coil, and a second Hall element disposed on the seat adjacent to the second coil. Magnetic flux variation is generated between the second magnet and the second coil by providing voltage to the second coil to move the seat in the second direction via the second guide element.

The camera module further comprises a pad disposed between the image detecting unit and the solenoid to cushion the force generated by the post abutting the image detecting unit in the second position.

The first guide element comprises a plurality of first holding portions disposed on a pair of sidewalls of the moving frame, and a pair of first guide bars held parallel by the first holding portions and fixed to the base, whereby the moving frame is joined to the base, and the moving frame moves in the axial direction of the first guide bar.

The second guide element comprises a plurality of second holding portions disposed on the seat, and a pair of second guide bars held parallel by the second holding portions and fixed to the moving frame, whereby the moving frame is joined to the seat, and the seat moves in the axial direction of the second guide bar. The axial direction of the second guide bar is perpendicular to the axial direction of the first guide bar.

The first magnet comprises an N pole and an S pole disposed in the axial direction of the first guide bar. The second magnet comprises an N pole and an S pole disposed in the axial direction of the second guide bar.

When the image detecting unit is idle, one half of the first Hall element is disposed on the N pole of the first magnet and the other half of the first Hall element is disposed on the S pole of the first magnet. When the image detecting unit is idle, one half of the second Hall element is disposed on the N pole of the second magnet and the other half of the second Hall element is disposed on the S pole of the second magnet.

BRIEF DESCRIPTION OF THE DRAWINGS

The invention can be more fully understood by reading the subsequent detailed description and examples with references made to the accompanying drawings, wherein.

DETAILED DESCRIPTION

Before the description, it is noted that location language, such as first direction X, second direction Y, or third direction Z, is based on the coordinate of each individual figure, and the first direction X, second direction Y, and the third direction Z are orthogonal.

Figure 3:
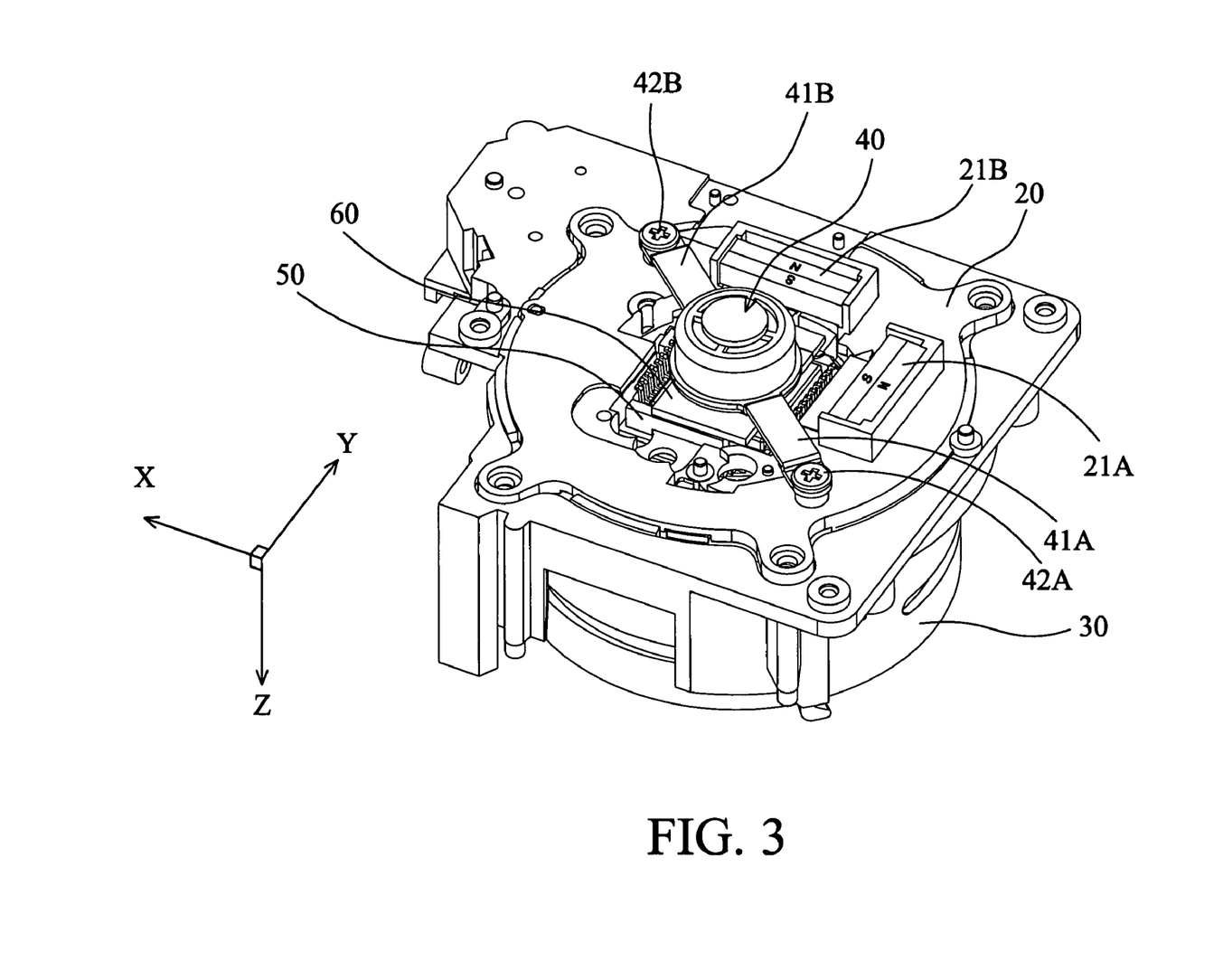
FIG. 3 is a perspective view of an embodiment of a camera module of the invention.

Referring to FIG. 3, an embodiment of a camera module of the invention comprises a base 20, a lens 30 joined to one side of the base 20, and a solenoid 40 joined to another side of the base 20. A frame 50 is disposed between the solenoid 40 and the lens 30 and joined to the base 20. An image detecting unit 60, such as a CCD, is disposed on the frame 50. An image of an object is formed on the image detecting unit 60 via the lens 50.

Figure 4:
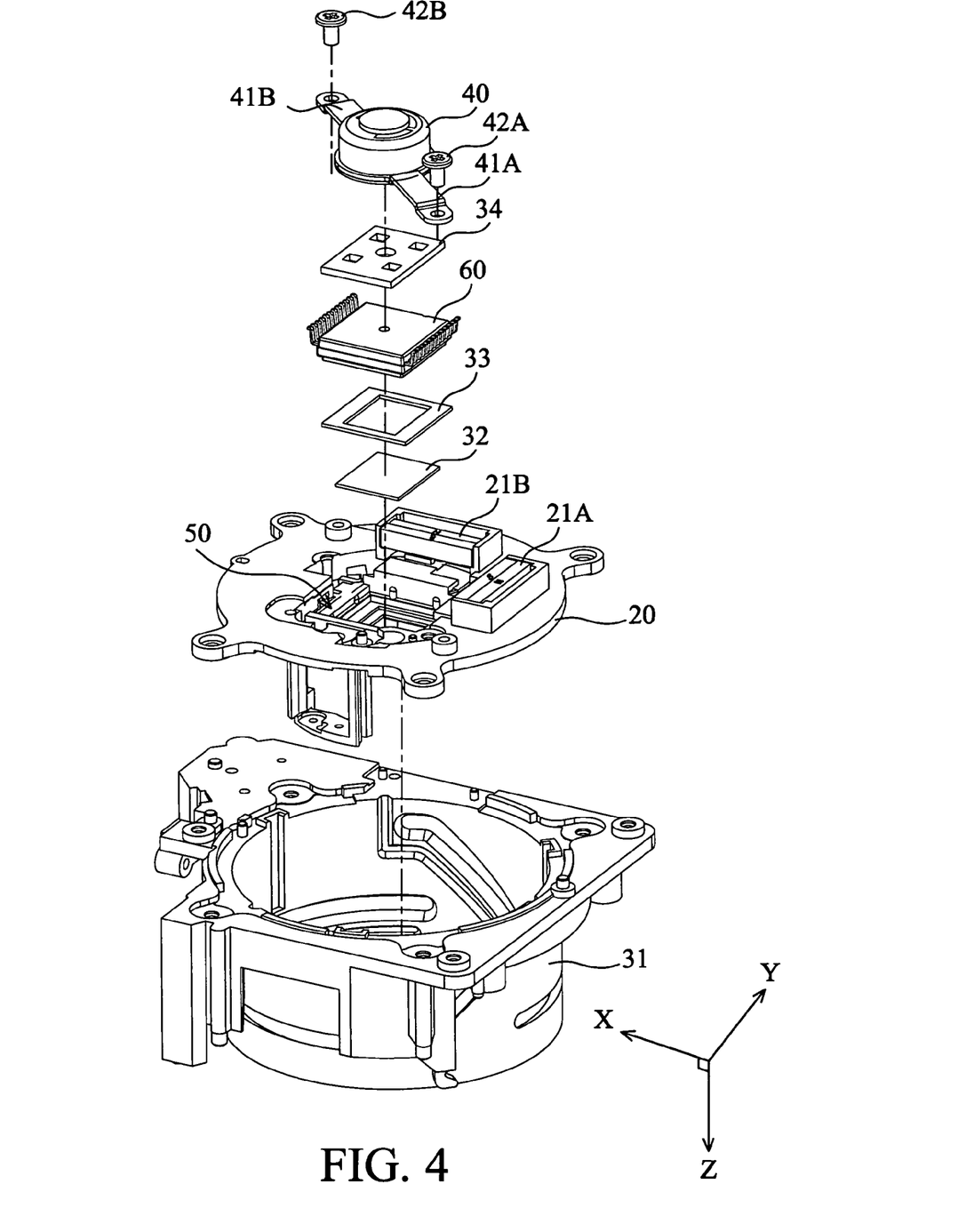
FIG. 4 is an exploded perspective view of an embodiment of a camera module of the invention.

Referring to FIG. 4, a cone 31 for the lens 30 is fixed to one side of the base 20 via bolts. The solenoid 40 has a pair of wing portions 41A, 41B by which the solenoid 40 is fixed to the base 20 via bolts 42A, 42B. The fame 50 is disposed between the solenoid 40 and the lens 30 and fixed to the base 20. The frame 50 comprises several coils (not shown) which generate magnetic force interacting with the magnet on the base 20 to move the frame 50. The image detecting unit 60 has a low-pass filter 32 and a rectangular frame 33 on the side facing the lens 30, and has a pad 34 on the side opposite the lens 30. When the image detecting unit 60 is inserted into and fixed to the frame 50, the low-pass filter 32 and the rectangular frame 33 are packed between the frame 50 and the image detecting unit 60.

Figure 5A:
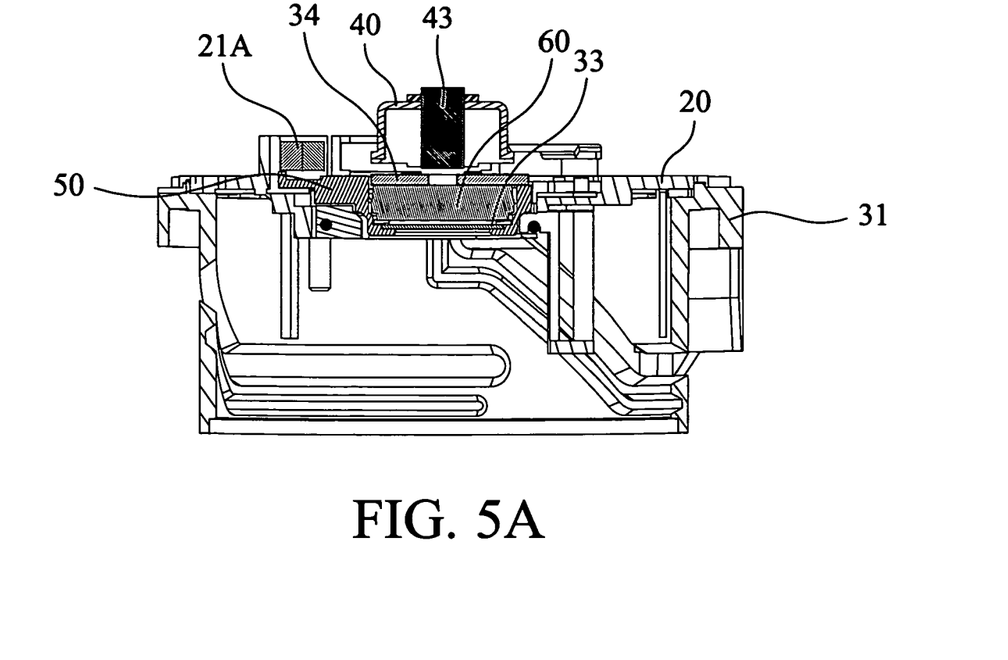
FIG. 5A is a cross section of a camera module of the invention wherein the post has no contact with the image detecting unit.
Figure 5B:
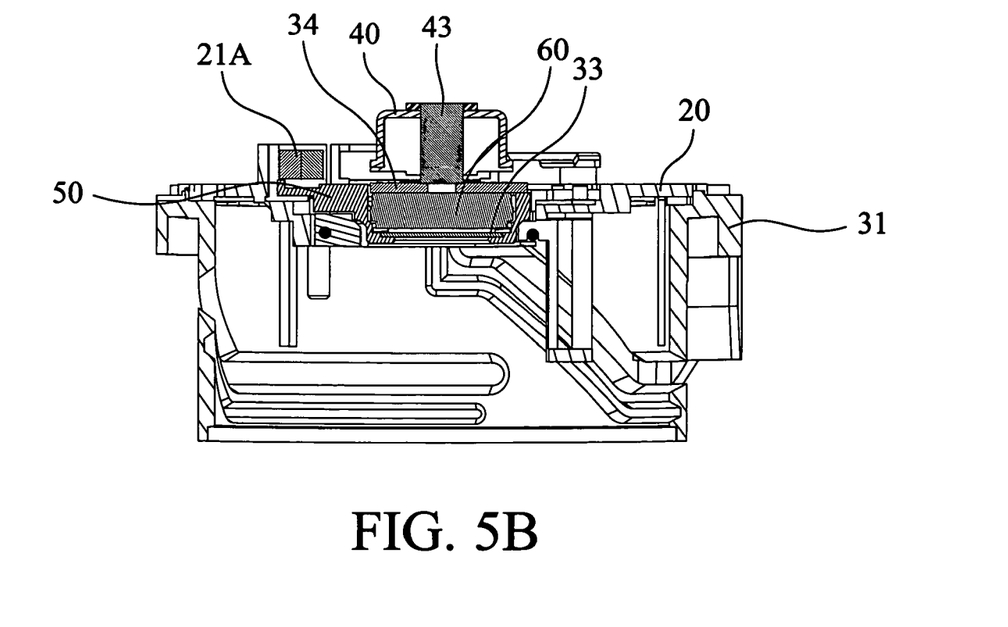
FIG. 5B is a cross section of a camera module of the invention wherein the post contacts the image detecting unit.

Referring to FIGS. 5A and 5B, the solenoid 40 has a post 43 controlled by external voltage signal to move between a first position and a second position. In FIG. 5A, when the post 43 is in the first position, the post 43 has no contact with the image detecting unit 60. At this time, the frame 50 is moved by the electromagnetic force so as to move the image detecting unit 60. In FIG. 5B, when the post 43 is in the second position, the post 43 contacts the image detecting unit 60. At this time, the frame 50 has no magnetic interaction with the magnets 21A and 21B, and the post 43 contacts and positions the image detecting unit 60. If the post 43 has no contact with the image detecting unit 60, the frame 50 can have arbitrary motion so that the image detecting unit 60 cannot enter the image range of the lens 30. In addition, the pad 34 is disposed between the post 43 and the image detecting unit 60 to prevent the post 43 from damaging the image detecting unit 60 when the post 43 is in the second position.

Figure 6:
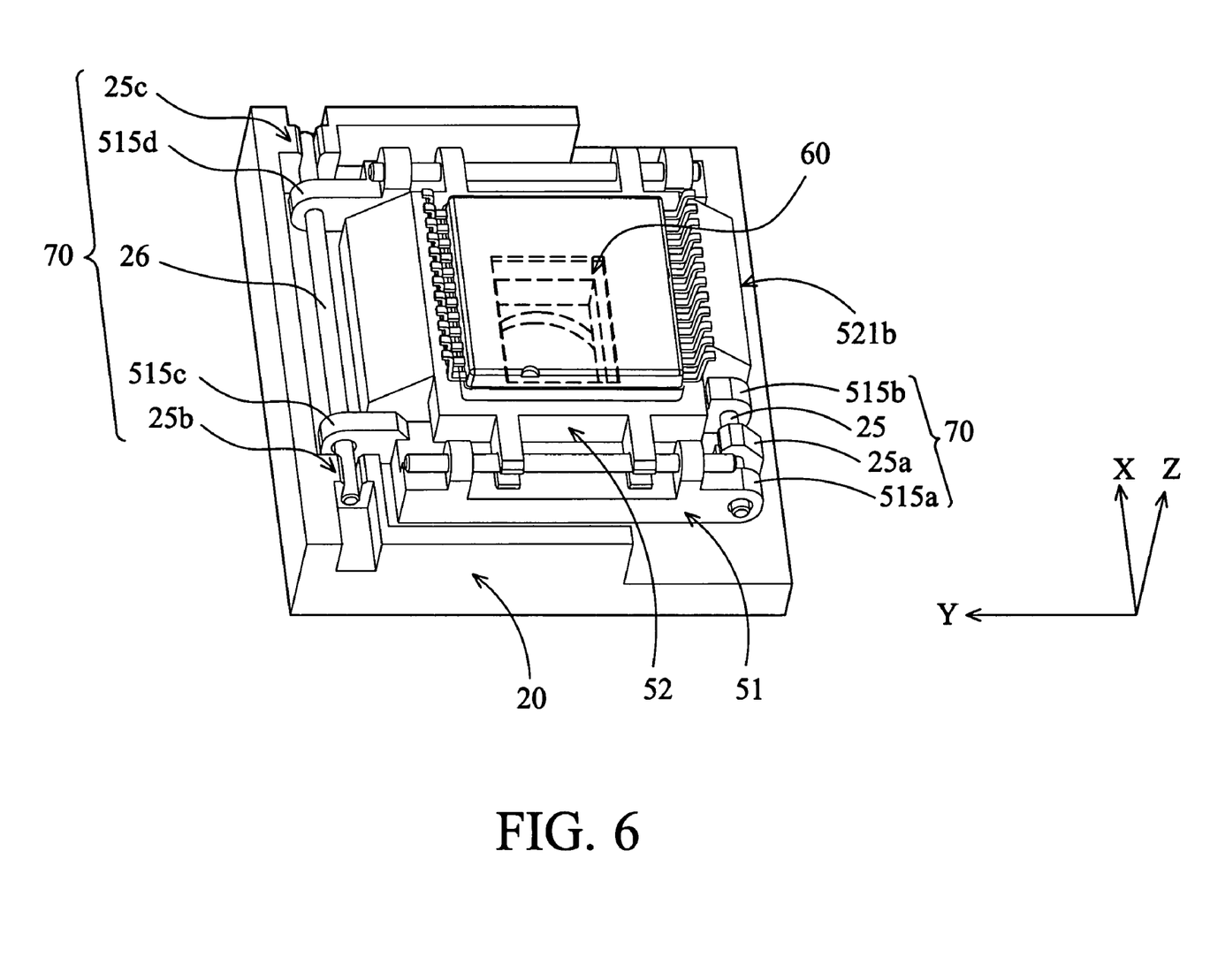
FIG. 6 is a rear view of a moving frame of the invention.

Referring to FIG. 6, the frame 50 comprises a moving frame 51 with a hollow portion 59, and a seat 52 movably disposed on the moving frame 51. The image detecting unit 60, such as CCD, is disposed on the seat 52. In addition, a detecting surface of the image detecting unit 60 faces the lens 30, i.e. in the third direction Z.

Figure 7:
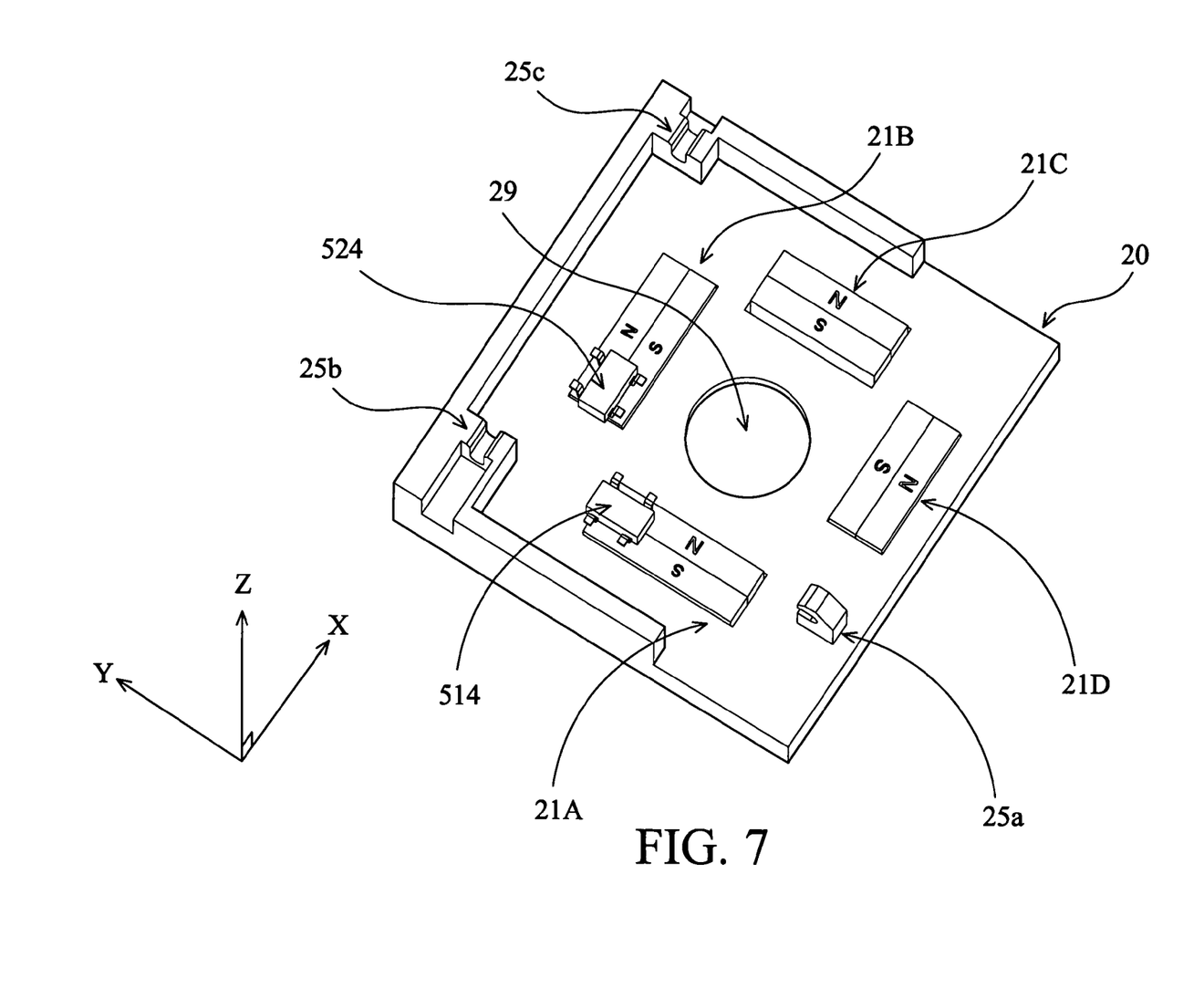
FIG. 7 is a perspective view of the camera module of the invention Hall elements and magnets.

Referring to FIG. 7, the base 20 has a pair of first magnets 21A and 21C, a pair of second magnets 21B and 21D and a pair of first shaft 25 and 26 which are parallel. The first magnets 21A and 21C are disposed parallel on two sides of the hollow portion 29. The N pole and the S pole of the first magnet 21A are disposed along the first direction X, and the N pole and the S pole of the other first magnet 21C are also disposed along the first direction X. The second magnets 21B and 21D are also disposed parallel on two sides of the hollow portion 29. The N pole and the S pole of the second magnet 21B are disposed along the second direction Y, and the N pole and the S pole of the other second magnet 21D are also disposed along the second direction Y. In addition, the S poles of the first magnets 21A and 21C face the hollow portion 29, and the S poles of the second magnets 21B and 21D face the hollow portion 29. In this embodiment, the relative positions of the first magnets 21A, 21C and the second magnets 21B, 21D are not limited. The first magnets 21A and 21C and second magnets 21B and 21D are fixed to the base 20 via adhesives, such as UV adhesive or thermal adhesive. The first magnet 21A and the second magnet 21b protrude from the side of the base 20 facing the solenoid 40.

Figure 8:
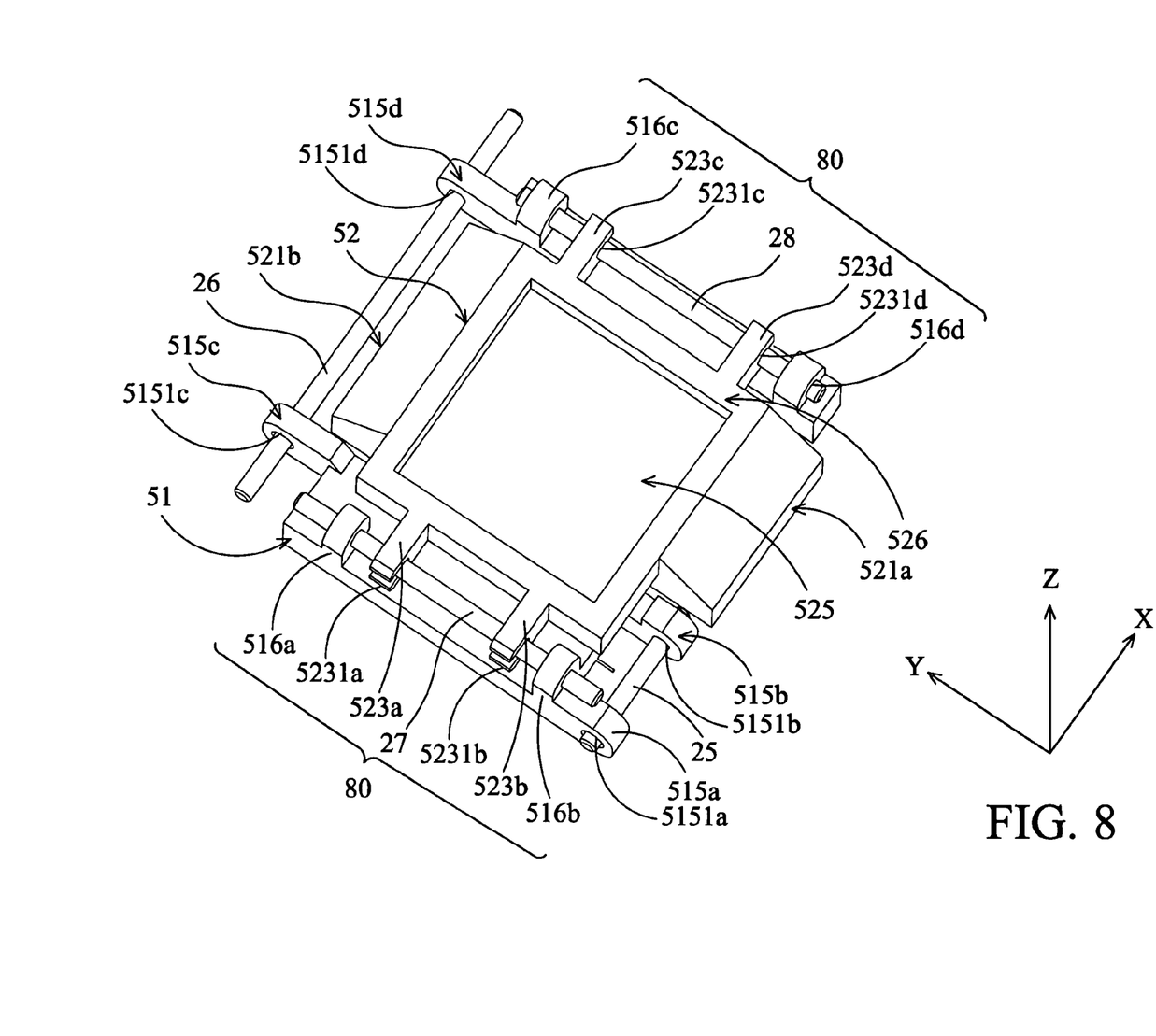
FIG. 8 is a perspective view of the camera module of the invention depicting a seat and a moving frame.
Figure 9:
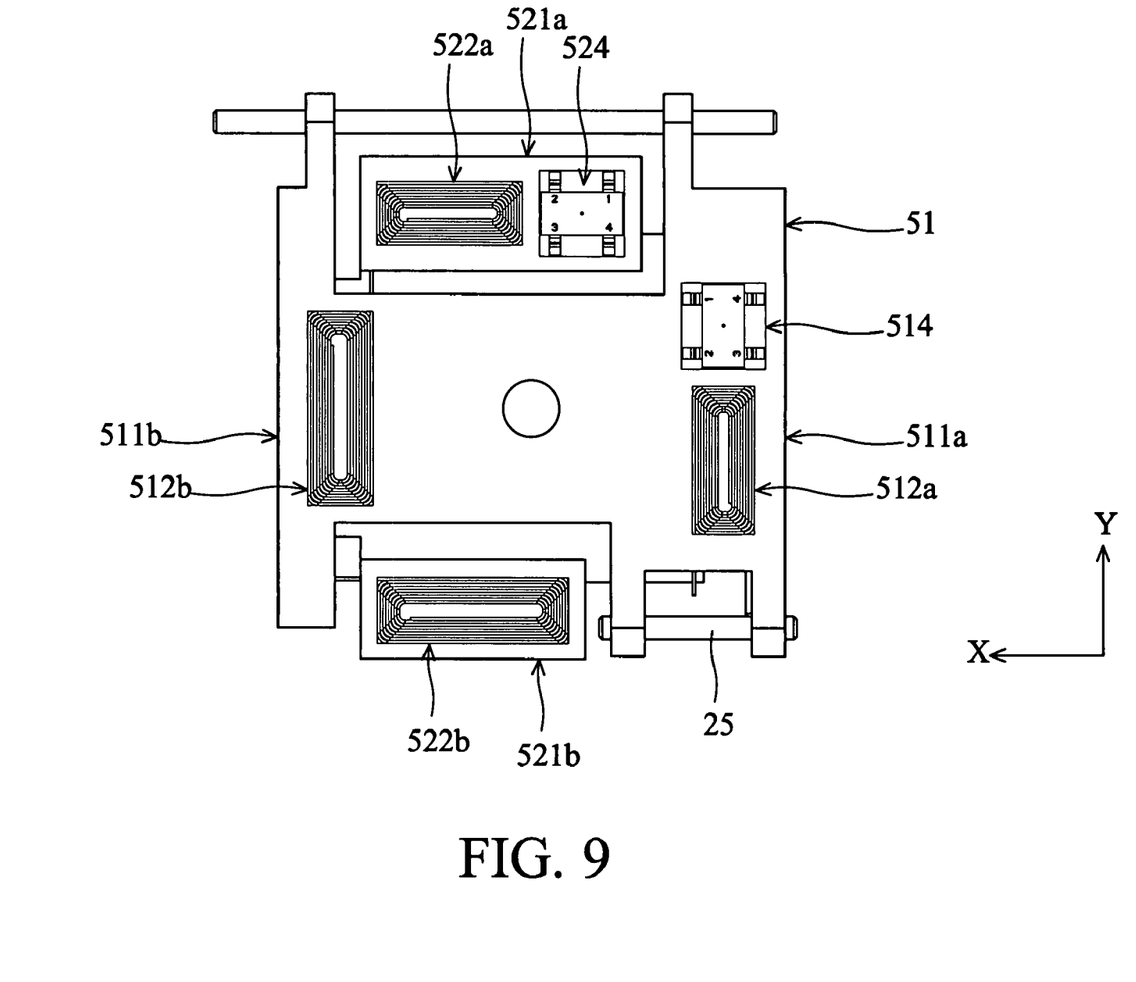
FIG. 9 is a top view of the camera depicting the coils and Hall elements disposed on the moving frame and the seat.

Referring to FIGS. 8 and 9, the seat 52 has two wing portions 521a and 521b on which a pair of second coils 522a, 522b and a second Hall element 524 are disposed. A second coil 522a is disposed on the wing portion 521a, and the second Hall element 524 is also disposed on the wing portion 521a adjacent to the second coil 522a. The other second coil 522b is disposed on the other wing portion 521b. The second coils 522a and 522b are substantially rectangular and parallel in the longitudinal direction. The moving frame 51 has two wing portions 511a and 511b on which a pair of first coils 512a, 512b and a first Hall element 514 are disposed. The first coil 512a is disposed on the wing portion 511a, and the first Hall element 514 is also disposed on the wing portion 511a adjacent to the first coil 512a. The other first coil 512b is also disposed on the wing portion 511b. The first coils 512a and 512b are substantially rectangular and parallel in the longitudinal direction. Two first holding portions 515a and 515b are disposed on the external sides of the moving frame 51 adjacent to the wing portion 521a. The first holding portions 515a and 515b have holes 5151a and 5151b respectively. Two first holding portions 515c and 515d are disposed on the wing portion 521b. The first holding portions 515c and 515d have holes 5151c and 5151d respectively.

A pair of first shafts 25 and 26 is parallel. The shorter first shaft 25 is disposed near the magnets 21A and 21D. The longer first shaft 26 extends through the holes 5151c and 5151d and is fixed to the holding portions 25b and 25c of the base 20. The shorter first shaft 25 extends through the holes 5151a and 5151b and is fixed to the holding portion 25a of the base 20. The first shaft 25, 26 and the holding portions 25a, 25b, 25c, 515a, 515b, 515c, 515d constitute a first guide element 70 along which the moving frame 51 moves in the first direction X.

Referring to FIGS. 8 and 9, the seat 52 further has a hollow portion 515 in which the image detecting unit 60 is disposed. The seat 52 further has a circuit (not shown) to which the image detecting unit 60 is electrically connected, and a rectangular frame 526 fixed to the circuit board and surrounding the image detecting unit 60. The rectangular frame 526 and a pair walls 5261 and 5262 have second holding portions 523a, 523b, 523c and 523d. The second holding portions 523a, 523b, 523c and 523d have holes 5231a, 5231b, 5231c and 5231d respectively. A pair of second shafts 27 and 28 is disposed along the second direction Y. The second shaft 27 is held by the holding portions 516a and 516b and inserted into the holes 5231a and 5231b. The other second shaft 28 is held by the holding portions 516c and 516d and inserted into holes 5231c and 5231d, whereby the moving frame 51 is joined to the seat 52. the second shafts 27, 28 and the holding portions 516a, 516b, 516c, 516d, 523a, 523b, 523c and 523d constitute a second guide element 80 along which the seat 52 moves in the second direction Y.

Figure 10:
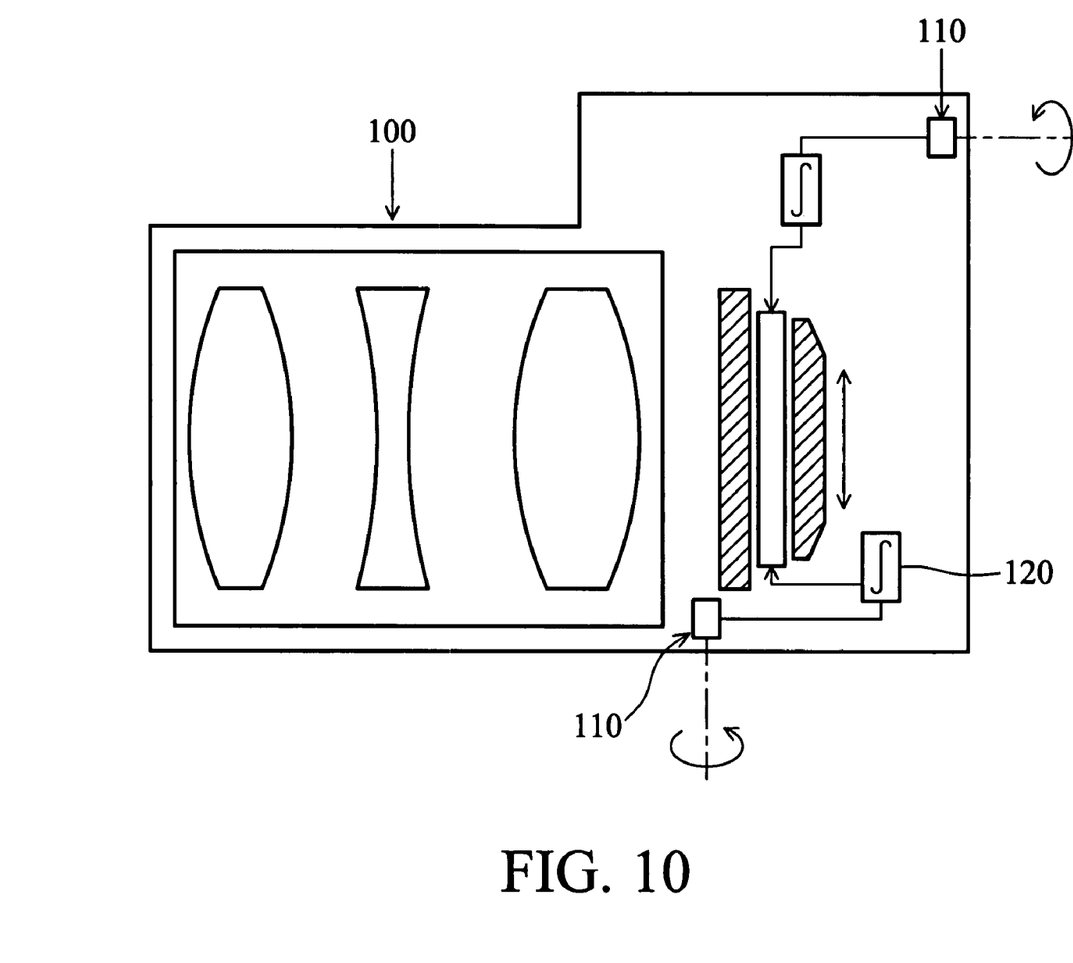
FIG. 10 depicts a camera with a camera module of the invention.

FIG. 10 depicts a camera employing the camera module of the invention. A camera 100 has a motion sensor 110, such as an angular acceleration element or a linear acceleration element. The motion sensor 110 detects movement of the camera 100 and provides a voltage signal to the coils 512a, 512b, 522a and 522b via a PWM circuit and a digital circuit. The coils 512a, 512b, 522a and 522b generate variable magnetic field interacting with the first magnet 21A, 21C and the second magnets 21B, 21D, whereby the seat 52 moves in the first direction X and in the second direction Y relative to the base 20. The image detecting unit 60 moves in the first and second directions X and Y, thereby preventing blur.

Referring to FIG. 7 again, when the camera 100 is idle, the fame 50 is also idle and one half of the Hall element 514 is disposed on the N pole of the first magnet 21A and the other half of the first Hall element 514 is disposed on the S pole of the first magnet 21A. One half of the second Hall element 524 is disposed on the N pole of the second magnet 21B, and the other half of the second Hall element 524 is disposed on the s pole of the second magnet 21B. The first and second Hall elements detect no magnetic field variations. When the camera 100 is moved, the coils 512a, 512b, 522a and 522b interact with the first and second magnets 21A, 21B, 21C and 21D to move the seat 52 in the first and second directions X and Y. The first and second Hall elements 514 and 524 detect magnetic field variation, thereby calculating displacement and motion frequency of the seat 52 to modify the voltage signal of the PWM circuit or the digital circuit.

The solenoid of the invention can position the image detecting unit when the frame provides no positioning mechanism. Because the invention changes the position of the image detecting unit with respect to the optical axis rather than adjusting lens position, image quality is not affected. Further the pair of coils and pair of magnets moving the image detecting unit result in the element having small volume, allowing reduced camera size.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera module, comprising:
   a base;
   a lens joined to the base;
   a frame movably disposed on the base;
   an image detecting unit fixed to the frame and moving on the base via the frame; and
   a solenoid having a post moving between a first position and a second position, wherein when the image detecting unit moves on the base via the frame, the post is in the first position and has no contact with the image detecting unit, and when the image detecting unit moves on the base not via the frame, the post is in the second position and abuts the image detecting unit to position the image detecting unit.

2. The camera module as claimed in claim 1, wherein the frame comprises:
   a first guide element by which the frame is joined to the base and moved in a first direction;
   at least one first coil disposed on the frame;
   at least one first magnet fixed to the base and opposite the first coil; and
   a first Hall element disposed on the frame adjacent to the first coil, wherein magnetic flux variation is generated between the first coil and the first magnet by providing voltage to the first coil, thereby moving the first guide element in the first direction.

3. The camera module as claimed in claim 2, wherein the frame further comprises:
   a moving frame joined to the base by the first guide element and moving in the first direction relative to the base, wherein the first coil and the first Hall element are disposed on the moving frame;
   a seat disposed on the moving frame capable of moving relative to the base.

4. The camera module as claimed in claim 3, wherein the seat comprises:
   a second guide element by which the seat is joined to the moving frame and moves in a second direction relative to the moving frame;
   at least one second coil disposed on the seat;
   at least one second magnet disposed on the base opposite the second coil; and
   a second Hall element disposed on the seat adjacent to the second coil, wherein magnet flux variation is generated between the second magnet and the second coil by providing voltage to the second coil to move the seat in the second direction via the second guide element.

5. The camera module as claimed in claim 4, wherein the second guide element comprises:
   a plurality of second holding portions disposed on the seat; and
   a pair of second guide bars held parallel by the second holding portions and fixed to the moving frame, whereby the moving frame is joined to the seat, and the seat moves in the axial direction of the second guide bar.

6. The camera module as claimed in claim 5, wherein the axial direction of the second guide bar is perpendicular to the axial direction of the first guide bar.

7. The camera module as claimed in claim 6, wherein the first magnet comprises an N pole and an S pole disposed in the axial direction of the first guide bar.

8. The camera module as claimed in claim 7, wherein the second magnet comprises an N pole and an S pole disposed in the axial direction of the second guide bar.

9. The camera module as claimed in claim 8, wherein when the image detecting unit is idle, one half of the first Hall element is disposed on the N pole of the first magnet and the other half of the first Hall element is disposed on the S pole of the first magnet.

10. The camera module as claimed in claim 9, wherein when the image detecting unit is idle, one half of the second Hall element is disposed on the N pole of the second magnet and the other half of the second Hall element is disposed on the S pole of the second magnet.

11. The camera module as claimed in claim 2, wherein the first guide element comprises:
   a plurality of first holding portions disposed on a pair of sidewalls of the moving frame; and
   a pair of first guide bars held parallel by the first holding portions and fixed to the base, whereby the moving frame is joined to the base, and the moving frame moves in the axial direction of the first guide bar.

12. The camera module as claimed in claim 1 further comprising a pad disposed between the image detecting unit and the solenoid to cushion the force generated by the post abutting the image detecting unit in the second position.

* * * * *